Figure 1:
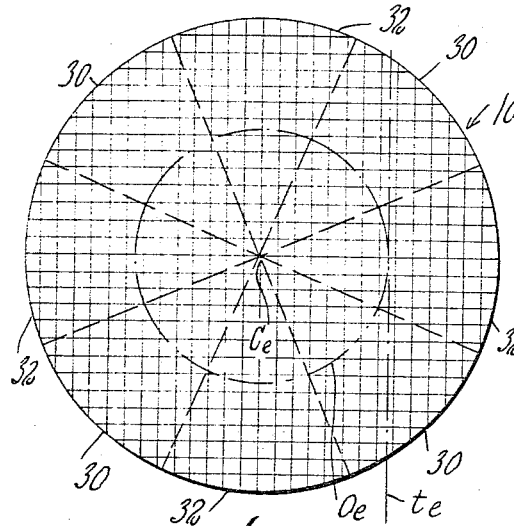

March 12, 1968  J. F. TAPLIN  3,373,236

METHOD OF MAKING ROLLING SEAL DIAPHRAGMS

Filed Dec. 28, 1962

United States Patent Office 3,373,236
Patented Mar. 12, 1968

3,373,236
METHOD OF MAKING ROLLING
SEAL DIAPHRAGMS
John F. Taplin, 15 Sewall St., West Newton, Mass. 02165
Filed Dec. 28, 1962, Ser. No. 248,049
8 Claims. (Cl. 264—313)

This invention relates to rolling seal diaphragms. More particularly, it provides a new and improved method of making rolling seal diaphragms of improved characteristics.

Rolling seal diaphragms have been widely used for a number of years, and offer great advantages in achieving substantially frictionless sealing between relatively movable pistons and cylinders. They are the subject of United States Patent No. 2,849,026, "Flexible Fluid Sealing Diaphragm," granted to me on Aug. 26, 1958, which teaches use therein of a limited extensible rolling wall fabric element in which threads in interlocking relationship permitting relative movement thereamong are rearranged by drawing between male and female dies to produce compression in the fabric on itself in a circumferential direction, such circumferential compression giving to the wall commensurate extensibility circumferentially.

It has been found that although the above procedure should build into all zones of the wall portion of the fabric element more than enough compression to accommodate any needed extension in use, rolling from a smaller piston to a larger cylinder, assuming compression to take place evenly around annular space between the male and female dies, this assumption does not in fact prove valid; on the contrary, compression takes place in different amounts in different angular zones of the fabric wall portions therebetween. Any such variation is undesirable not only because it tends to promote angular movement in the wall of the rolling diaphragm in use (with consequent scrubbing and added wear), but also because it may result in so little compression in particular zones that extensibility is there inadequate, which greatly accentuates "borrowing" from adjacent zones, angular movement, and scrubbing. For example, in drawing flat loomed blanks between male and female dies, there is a tendency for much more circumferential compression to take place in bias zones than in the other zones therebetween, centrally of which tangents to imaginary circles about a center of the blank are parallel to one set of crossing threads; and, ironically, the bias zones need compression least, for the bias effect gives them inherent limited extensibility wholly aside from any circumferential compression.

Accordingly, it is a primary object of the present invention to provide a method of drawing fabric blanks in such a way that circumferential extensibility is more evenly distributed around the periphery of the rolling wall portion of the resultant fabric element and completed diaphragm. It is a further object to accomplish this with simplicity and without need for any substantial added capital investment. It is a further object to accomplish this with a method which permits leaving intact the head portion of the fabric element, it being defined by interlocking threads integral with and continuous with those of the rolling wall portion, for increased structural integrity, and in which the head portion need be given no circumferential compression, as would impair somewhat its structural integrity for anchoring purposes.

Generally speaking, the present invention contemplates placing against a fabric blank more readily circumferentially compressible in at least one zone than in at least another a deformable die more readily circumferentially compressible in at least one zone than in at least another, the more readily circumferentially compressible zone of one overlying the less readily circumferentially compressible zone of the other and vice versa, and simultaneously circumferentially compressing both by drawing them between male and female drawing dies while confining them in a thickness direction both within and without the drawing dies to prevent any doubling upon itself of the fabric of the blank.

Figure 2:
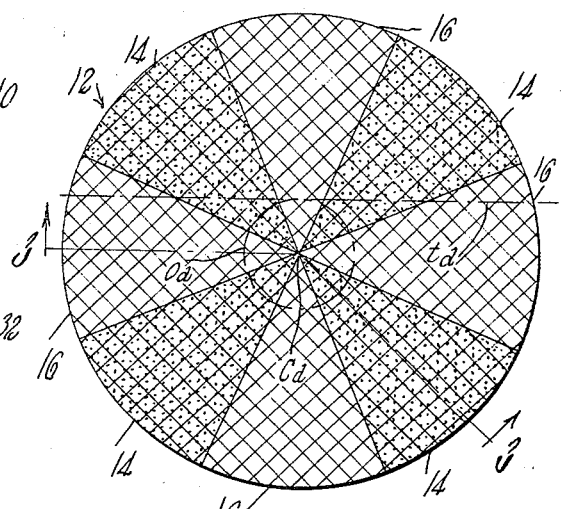
Figure 3:
Figure 4:
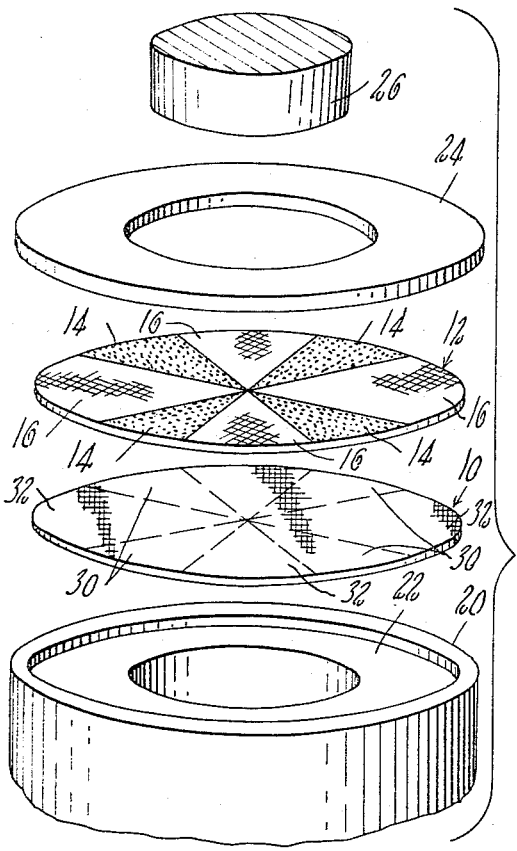
Figure 5:
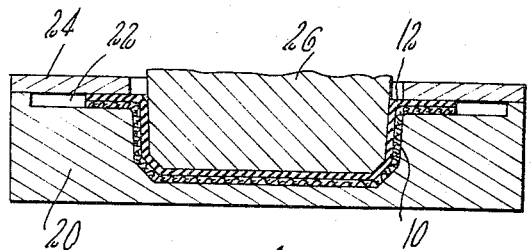
Figure 6:
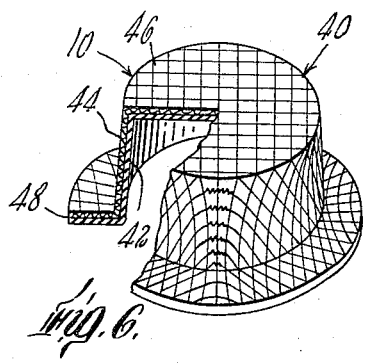

Other objects, advantages, and features will appear from the following description of a preferred embodiment, taken together with the attached drawings relating thereto, in which:

FIG. 1 is a woven blank;
FIG. 2 is a deformable die;
FIG. 3 is a sectional view taken at 3—3 of FIG. 2;
FIG. 4 is an exploded view showing a woven blank, deformable die, and drawing dies including slip ring;
FIG. 5 is a sectional view through the drawing dies showing the woven blank formed into a woven element; and
FIG. 6 is an isometric view, partially broken away, showing a rolling seal diaphragm incorporating the said woven element.

Referring now in more detail to the drawings, there is diagrammatically shown in FIG. 1 a fabric blank 10 woven from warp and fill threads which interlock, but at the same time permit to at least some extent relative movement of threads. In FIG. 2 is shown a deformable die 12 which may suitably be identical with blank 10, except that in zones 14 cured rubber material coats the warp and fill threads and fills the interstices between them, so that in these zones circumferential compressibility is negligible, and the zones have surfaces characterized by a higher coefficient of friction. Even if the rubber material were omitted, the zones 14 are of course still significantly less compressible circumferentially than the bias zones 16 which alternate with them.

By "circumferential," I means directions constituting tangents to imaginary circles about the center $c_e$ of the element 10 or the center $c_d$ of the deformable die; for example, direction $t_e$ tangent to imaginary circle $o_e$, or direction $t_d$ tangent to imaginary circle $o_d$. In the finished elements these directions all lie in planes perpendicular to the axis of the element and its rolling wall, and are tangential to the fabric layer of the rolling wall. In the bias zones, as with $t_d$, the directions are always at substantial angles to warp and fill threads. However, centrally of each other zone, as for $t_e$, the circumferential direction is parallel to a thread in the loomed blank. I do not mean to restrict myself to loomed blanks however, since the invention is applicable whenever circumferential compressibility is different in different zones of fabric defined by relatively movable interlocking threads, such for example as flat knitted fabric.

The rubbery material used in the zones 14 may be of any desired sort, natural or synthetic. Indeed, any material reducing circumferential compressibility may if desired be used, such as materials which reduce relative movability of threads without filling interstices.

The blank 10 may then be placed over female drawing die 20 around the central hole in which is counterbore 22 of depth corresponding to the thickness of the stack made up of blank 10 and deformable die 12, so that when slip ring 24 is brought into position, the blank and the stack are restrained against doubling upon themselves while being drawn by male drawing die 26 into the relationship shown in FIG. 5. The annular spacing between the drawing dies corresponds also in the preferred embodiment to the above stack thickness, for the same purpose of preventing doubling of blank or stack upon itself to cause pleating, which is very deleterious to long life, and which is characterized by the appearance for at least a limited space of three thicknesses of material. In no event must the spacing between the drawing dies in a thickness direction, or the depth of the counterbore, be as much as three times the thickness of the stack, although it will be understood that the stack may be made up of more than two thicknesses from the combined blanks and deformable dies therein. For example, a deformable die may be sandwiched between two blanks.

As is seen in the drawing, the non-compressible circumferentially zones 14 of the deformable die are placed over the most compressible circumferentially bias zones 30 of the blank 10, while the most compressible circumferentially bias zones 16 of the deformable die overlie the relatively circumferentially incompressible zones 32 of the blank. When the stack constituting the blank and the deformable die are then simultaneously drawn between the drawing dies, the zones 14 of the deformable die not only resist circumferential compression, but tend to hold the bias zones 30 of the blank against compression and force compression in the more difficultly circumferentially compressible other zones 32 thereof. In consequence, more uniform circumferential compression is produced around the entire periphery of the rolling wall portion of the fabric element formed from the blank in the drawing dies, with less added compression in bias zones which need it less, and more in other zones which need it more.

The fabric element 10 formed from the blank 10 should be set in the configuration given it by the dies, as shown in FIG. 5. The fabric for the fabric element 10 or the deformable die 12 may be any suitable one, such as Dacron, Orlon, or fiberglass; and setting may be in any manner desired, for example using heat alone or with some impregnant, such as starch.

The diaphragm 40 is then completed by assembling a fluid tight layer of elastomer 42 thereto. Methods of doing this are disclosed in my above-mentioned patent. Preferably the elastomer is applied in such a way that while a liquid it flows down the rolling wall 44 away from the head 46, so as to insure that freedom from axial (having a component parallel to the diaphragm axis) extensibility (which was removed from the fabric blank in the drawing step) is maintained. The elastomer may be rubber or synthetic rubber (including silastic), as preferred. The layer of elastomer is on the inside in the embodiment shown, but may be on the outside if preferred; in either case the elastomer preferably permeates the interstices of the fabric element as well. The base 48 of the diaphragm may be trimmed as desired, and any holes required in the head 46 or base 48 may be punched. An advantage of the present method is that holes in the head may be minimized or eliminated, to increase structural integrity, permitting increased number of threads to extend not only from the wall into the head, but the same threads to continue on into the wall after crossing the head.

Other embodiments within the scope of the claims will occur to those skilled in the art.

I claim:
1. The method of manufacturing a rolling seal diaphragm which comprises the steps of
    forming a blank from fabric defined by a multiplicity of threads in interlocking relationship to permit limited relative movement thereamong,
        said fabric being compressible upon itself with rearrangement of said threads in directions tangential to imaginary circles around a center thereof,
        said fabric being more readily compressible upon itself along a first of said directions in a first zone than along a second of said directions in a second zone, and
        said fabric having upper and lower surfaces generally defined by said threads and spaced apart by an amount constituting the initial thickness of said fabric;
    placing against at least one of said surfaces a deformable die to cooperate with said blank in forming a stack including said blank and said deformable die,
        said deformable die including a third zone overlying said first zone and a fourth zone overlying said second zone,
        said fourth zone being more readily compressible along said second of said directions than is said third zone along said first of said directions;
    drawing said stack between male and female drawing dies to rearrange said threads and circumferentially compress said blank in directions including said first of said directions,
        while simultaneously confining said stack in a thickness direction within and without said drawing dies to maintain said fabric throughout at a final thickness less than three times said initial thickness;
    setting said fabric in the drawn configuration; and removing said deformable die.

2. The method of claim 1 in which said deformable die has a higher coefficient of friction over said third zone surface in contact with said blank than over said fourth zone surface in contact with said blank.

3. The method of claim 1 in which said deformable die is defined by a multiplicity of threads in interlocking relationship to ordinarily permit limited relative movement thereamong, said fourth zone being untreated to permit said limited relative movement, and said third zone being treated to restrain said limited relative movement.

4. The method of claim 3 in which said deformable die is formed from woven fabric, and said third zone includes cured rubbery material restricting compression of said deformable die upon itself thereat.

5. The method of manufacturing a rolling seal diaphragm which comprises the steps of
    forming a flat blank from woven fabric defined by a multiplicity of warp and fill threads in interlocking relationship to permit limited relative movement thereamong,
        said fabric being compressible upon itself with rearrangement of said threads in directions tangential to imaginary circles around a center thereof,
        said blank including four bias zones alternating with four other zones around said circles and being more readily compressible upon itself along said directions in said bias zones than in said other zones, and
        said blank having upper and lower surfaces generally defined by said threads and spaced apart by an amount constituting the initial thickness of said fabric;
    placing against at least one of said surfaces a flat deformable die to cooperate with said blank in forming a stack including said blank and said deformable die,
        said deformable die including in contact with said bias zones a first set of die zones and in contact with said other zones a second set of die zones, the deformable die being more compressible upon itself in said directions in said second set than in said first set;
    drawing said stack between male and female drawing dies to rearrange said threads and circumferentially compress said blank in said directions in said other zones,
        while simultaneously confining said stack in a thickness direction within and without said drawing dies to maintain said fabric throughout at a final thickness less than three times said initial thickness;
    setting said fabric in the drawn configuration; and removing said deformable die.

6. The method of claim 5 in which said deformable die has a higher coefficient of friction over said first set of die zones than over said second set of die zones.

7. The method of claim 6 in which said deformable die is defined by a multiplicity of threads in interlocking relationship to ordinarily permit limited relative movement thereamong, said second set of die zones being untreated to permit said limited relative movement, and said first set of die zones being treated to restrain said limited relative movement.

8. The method of claim 7 in which in said first set of die zones cured rubber fills interstices in said threads and coats said threads, whereby said deformable die is substantially incompressible upon itself in said directions at said first set of die zones, and has a higher coefficient of friction thereat.

References Cited

UNITED STATES PATENTS

| | | | |
|---|---|---|---|
| 2,590,221 | 3/1952 | Stevens | 156—224 |
| 2,646,183 | 7/1953 | Pellett | 156—291 |

ROBERT F. WHITE, *Primary Examiner.*

EARL M. BERGERT, *Examiner.*

W. J. VAN BALEN, R. R. KUCIA, *Assistant Examiners.*